Nov. 1, 1938.   L. KAMENAROVIĆ   2,135,007
DISTRIBUTOR FOR FLUID PRESSURE BRAKE SYSTEMS
Filed Jan. 12, 1933   2 Sheets-Sheet 1
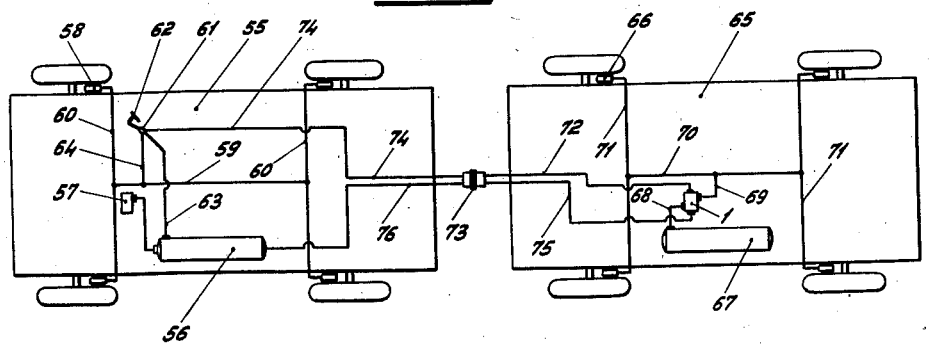
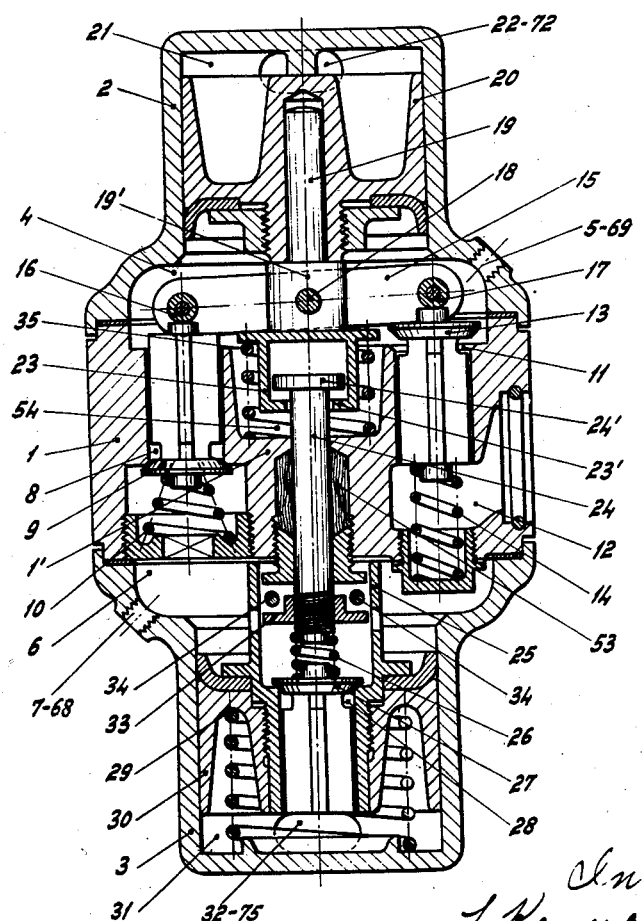
Inventor:
L. Kamenarović
By E. F. Wendroth
Atty Nov. 1, 1938.   L. KAMENAROVIĆ   2,135,007
DISTRIBUTOR FOR FLUID PRESSURE BRAKE SYSTEMS
Filed Jan. 12, 1938   2 Sheets-Sheet 2

Inventor:
L. Kamenarović
By C. F. Wendroth
Atty

Patented Nov. 1, 1938

2,135,007

UNITED STATES PATENT OFFICE 2,135,007

DISTRIBUTOR FOR FLUID PRESSURE BRAKE SYSTEMS

Leone Kamenarović, Milan, Italy, assignor to Fabbrica Italiana Magneti Marelli Società Anonima, Milan, Italy, a corporation of Italy Application January 12, 1938, Serial No. 184,673
In Italy January 18, 1937

13 Claims. (Cl. 303—26)

This invention relates to an automatic distributor for pressure fluid brakes of vehicles and more particularly for brakes of vehicles having an auxiliary reservoir for pressure fluid, and said distributor provides for the operation of the vehicle brakes by the fluid of said auxiliary reservoir under the action of the general brake control means and also for the supply of said auxiliary reservoir automatically by a main reservoir and for automatic application of the vehicle brakes when the supply of pressure fluid from the main reservoir fails through any reason.

The present invention is particularly useful in connection with brake systems in trailed vehicles in which the auxiliary reservoir is located on the trailed vehicle when the main reservoir is located on the tractor vehicle; further this invention is adapted for the actuation of the distributor by means of pressure fluid coming from the brake control conduit of the tractor vehicle.

The present invention also includes an arrangement of the valves controlling the communication of the trailed vehicle brake cylinders with auxiliary reservoir of pressure fluid and with outlet as well as an arrangement of the parts actuating said valves for normal and emergency actuations of the brakes, and means for release of the brakes when the trailer vehicle brake system is separated from the main reservoir of pressure fluid.

On the annexed drawings:

Figure 1 is a diagram of the brake system and conduits in a tractor vehicle and in a trailer vehicle, showing the general organization of said system and the conditions of cooperation of the distributor of this invention therewith;

Figure 2 is a central longitudinal section of a distributor according to this invention;

Figure 3:
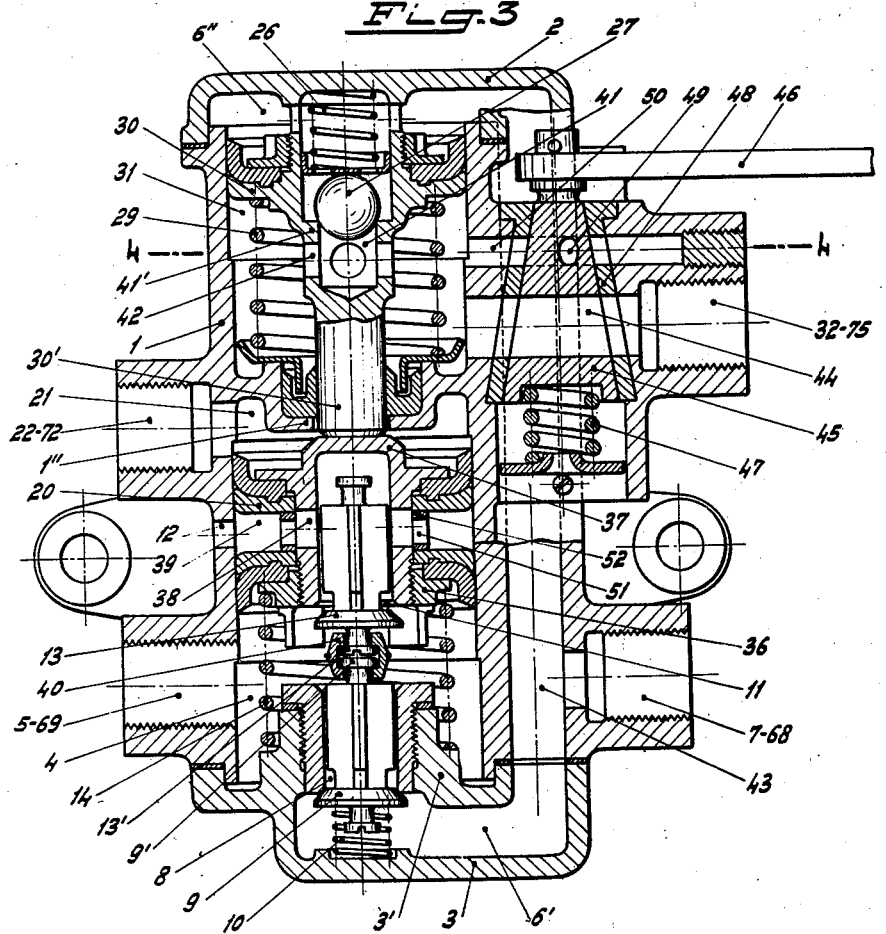
Figure 3 is a central longitudinal section of a further embodiment of a distributor according to this invention in part on line 3—3 and in part on line 3—3' of Fig. 4.

In the diagram of Fig. 1, 55 denotes the tractor vehicle having a main pressure fluid reservoir 56 supplied by a compressor 57; said vehicle is provided with cylinders 58 whose pistons actuate the brake gears affixed to its wheels and with conduits 59, 60 by means of which the pressure fluid from said main reservoir is caused to actuate said brake cylinders 58 under the control of a valve 61 actuated by a pedal 62 and connected with said reservoir 56 and conduits 59, 60 by means of tubes 63, 64; the trailer vehicle 65 has brake actuating cylinders 66 energized by pressure fluid supplied by an auxiliary reservoir 67 under the control of the distributor of this invention shown at 1 as connected with the auxiliary reservoir 67 by means of a tube 68 and with the cylinders 66 by means of tubes 69, 70, 71.

Said distributor 1 is further connected by means of a tube 72 and a coupling 73 with a tube 74 located on the tractor and leading to the pedal valve 61 for the controlled action of pressure fluid from the main reservoir 56 on said distributor 1 for the actuation of brake cylinders 66; the tubes 75 and 76 interconnected by the coupling 73 provide for direct supply of pressure fluid from the main reservoir 56 to the auxiliary one under the control by said distributor 1.

As known, assuming that suitable fluid pressures exist in reservoirs 56 and 67, when the pedal valve 61 is actuated, pressure fluid is supplied from reservoir 56 through conduits 63, 64, 59, 60 to energize the brake cylinders 58 and also through conduits 74, 72 to actuate the distributor 1 to cause pressure fluid from reservoir 67 to energize brake cylinders 66 through 68, 1, 69, 70, 71; the pressure fluid is restored in auxiliary reservoir 67 from main reservoir 56 through conduits 76, 75 and under the control of the distributor 1.

In the embodiment illustrated in Figure 2, the distributor includes a casing 1 whose ends are closed by two removable heads 2 and 3, to provide, after one or both said heads are removed, a free access to members mounted in said casing for adjustments and repairs as may be necessary.

The casing 1 and head 2 confine a chamber 4 which is connected by means of port 5 and tube 69 with the brake cylinders 66 of the trailed vehicle; a chamber 6 confined by the casing 1 and head 3 is connected, by means of port 7 and tube 68, with the auxiliary reservoir 67 located on the trailed vehicle (Figures 1 and 2).

In the intermediate partition 1' of casing 1 which separates the chambers 4 and 6 from each other, an orifice 8 is provided which is controlled by a valve 9 held in closed position by the spring 10; said partition has also an aperture 11 connected with an outlet 12 opening in the atmosphere under the control of a valve 13 biased towards open position by a spring 14.

Both valves 9 and 13 are actuated by a rocker 15 having rollers 16 and 17 operative on said valves and mounted on a pivot 18 located in a forked head 19' of a sliding rod 19 which extends in the head 2 and at its lower end provides a box 23; a spring 35 located in a depression 54 of the partition 1' acts on the box 23 to move the rocker 15 off from valves 9 and 13. The spring 14 is more flexible than spring 10; accordingly when the rocker 15 is moved towards valves 13 and 9 the valve 13 is firstly closed and thereafter valve 9 opens; on the other hand valve 9 firstly closes and thereafter valve 13 opens when said valves are released by rocker 15.

The head 2 provides a cylinder 21 in which a piston 20 reciprocates; said piston 20 has a slidable fit on stem 19 and may act by thrust on said stem by means of its face opposite a shoulder 19' of stem 19 while the opposite face of said piston is acted on by the pressure fluid entering the cylinder 21 through inlet 22; said inlet 22 is connected with tube 72 and consequently with the pedal actuated valve 61 which, as above stated, controls the supply of pressure fluid to the brake cylinders of the tractor vehicle and also the actuation of distributor 1.

The bottom head 3 provides a cylinder 31 connected by means of a port 32 and tubes 75, 76 with the main reservoir 56 of the tractor vehicle; a piston 30 is mounted to reciprocate in said cylinder 31 and it confines a chamber 6 therein, said piston 30 being acted on in opposite directions by the pressure fluid operative in chamber 6 on one side and by a spring 29 and main reservoir pressure on the other side.

The piston 30 has a central aperture 28 controlled by a valve 27 which is biased by a spring 26 into its position to close the aperture 28.

Further said piston 30 has a projecting collar 25 through which a stem 24 extends which passes through the partition 1' of the casing 1, a tight seal being provided between the parts 1' and 24 by a gland 53.

The bottom end of the stem 24 on which the spring 26 operative on the valve 27 abuts, is provided with an adjustable collar 33 which is adapted to be engaged by two cross pins 34 fast in the collar 25 of the piston 30 when a downward motion of the piston 30 occurs; the top end of stem 24 provides a head 24' adapted to engage a bottom flange 23' of box 23 fast with stem 19, 19' at the time said stem 24 is moved downwardly.

Assuming the parts of the device to be in their operative position shown in Figure 2 the pressure fluid supplied through 75, 76 and inlet 32 from the main reservoir 56 into the cylinder 31 opens the valve 27 and enters chamber 6 to go through 7 and 68 to the auxiliary reservoir 67 located on the trailed vehicle. Owing to the balance of pressures which then exists in the chamber 6 and cylinder 31 when the valve 27 is open, the piston 30 remains in its inoperative position under the action of spring 29, as illustrated.

When the operator causes the brakes of the tractor vehicle to be applied by the actuation of the pedal valve 61 the pressure operative in the conduit 75, 76 leading to the cylinder 31 remains unchanged and accordingly the piston 30 does not move, while the control pressure fluid supplied from the conduits 74 and 72 and port 22 is operative in the cylinder 21 and on the top face of piston 20 which then moves down and acts by thrust on the stem 19, 19' shifting it downwardly against the action of spring 35; then the rocker 15 and the valves 9 and 13 are operated the valve 13 being first closed and the valve 9 being subsequently opened while the stem 24 is left stationary on account of lost motion provided intermediate its head 24' and the surface of the box 23 opposite thereto, the above described operation of valves 13 and 9 being provided for by respective resiliencies of springs 10, 14, as above described. The pressure fluid is thus caused to flow from chamber 6 and auxiliary reservoir 67 connected therewith to brake cylinders 66 of the trailed vehicle through 7, 6, 8, 4, 5, 69, 70, 71.

The controlled actuation of the brakes of the trailed vehicle is thus obtained, the supply of pressure fluid to said brake cylinders being proportional to the stroke of piston 20 under the action of the control pressure fluid caused to act thereon in opposition to spring 35 and pressure operative in chamber 4 and therefore with the pressure made operative on said piston 20 by the control valve 61 of the tractor vehicle; the possible leakages in the conduits and devices located on the trailed vehicle are compensated for by a larger rate of opening of valve 9 as occurring in such circumstances under the pressure operative in the cylinder 21 in view of the lower pressure in chamber 4.

When the control valve 61 is actuated to release the brakes, the pressure falls down in the cylinder 21 and accordingly the piston 20 moves back with stem 19, 19' and rocker 15 under the action of spring 35 to permit the valve 9 to close and valve 13 to open; the brakes of the trailed vehicles are thus released owing to the escape of pressure fluid from brake cylinders 66 through conduits 71, 70, 69, port 5, chamber 4, port 11 and outlet 12.

Should the trailed vehicle system become separated from the tractor vehicle one by effect of the disconnection of coupling 73 or generally should the fluid pressure fail within cylinder 31, such emergency requiring the brakes of the trailed vehicle to be automatically applied to a full extent and be held applied, the valve 27 closes under the action of its spring 26; then the pressure existing in chamber 6 connected with the auxiliary reservoir 67 on the trailed vehicle and acting on the piston 30 predominates on the spring 29 and causes the piston 30 to move down and to shift the stem 24 therewith by means of the pins 34 of its collar 25 engaging the collar 33; then the head 24' of the stem 24 engages the flange 23' of the box 23 fast with the stem 19, 19' and depresses the spring 35 to carry said stem up to the bottom end of its own stroke the stem 19 being free from the piston 20 in the contemplated direction of motion.

Then the rocker 15 and valves 13 and 9 operate in the described manner to cause the full actuation of the brake cylinders 66 of the trailer vehicle under the action of the fluid contained in the auxiliary reservoir 67; the trailer brakes are thereafter held applied until the pressure is restored in the cylinder 31 and the piston 30 is permitted to move up to provide for the return motion of the stem 19, 19' with rocker 15 under the action of spring 35.

Figure 4:
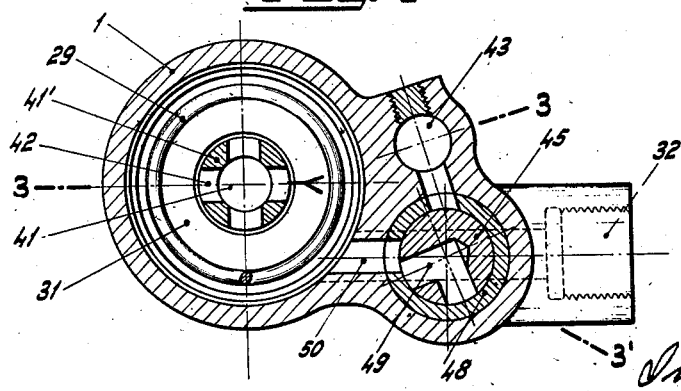
Figure 4 is a transverse section on line 4—4 of Fig. 3.

The hereinafter described embodiment shown in Figures 3 and 4 provides a compact and efficient arrangement of the valves 9 and 13 intended to control the communication of the brake cylinders 66 of the trailed vehicle with the auxiliary reservoir 67 of pressure fluid located on said vehicle and with the outlet 12; this embodiment also includes another arrangement of the pistons 20 and 30 intended to actuate said valves for normal brake operation and for automatic emergency operation, and finally it includes the provision in the same device of a shutter for the release and the application of the brakes of the trailed vehicle in the period when the brake system of said trailed vehicle is separated from the main reservoir 56 of pressure fluid.

This construction includes a casing 1 having a head 2 at one end and an intermediate partition 1'' while a head 3 providing a chamber 6' closes said casing at the opposed end thereof. The chamber 6' is separated from the space within casing 1 by means of a partition 3' provided by the head 3 and having an aperture 8 controlled by a valve 9 which is biased to closed position by a spring 10.

A piston 20 is mounted to reciprocate in the casing 1 intermediate the partitions 1'' and 3'; said piston 20 includes two sections spaced by a ring 52 having apertures 51 therethrough and a cup sleeve 37 is mounted in a central aperture of piston 20 and engaged therein by a screw-threaded collar 36, the side wall of the cup sleeve 37 having apertures 38 which communicate with apertures 51 and the space 39 confined between the two sections of the piston 20 and hence with outlet port 12 provided in the casing 1. The mouth of the cup sleeve 37 provides the seat 11 of a valve 13 connected longitudinally with the valve 9 by means of a coupler 40 which engages the enlarged heads 9' and 13' of the two valves 9 and 13.

A piston 30 is mounted to reciprocate in the chamber 31 defined by the head 2 and the partition 1'' of casing 1, and the stem 30' of said piston provides a longitudinal chamber 41 which is in communication on the one side with the chamber 6'' intermediate the piston 30 and the head 2 and on the other side with chamber 31 through ports 42; the chamber 41 provides a seat 41' on which a ball valve 27 is seated by a spring 26 which abuts on the head 2.

The piston 30 is loaded by a spring 29 abutting on the stationary partition 1'' and biasing it in its location adjacent to head 2 with the valve 27 forced on cooperating seat 41' by the spring 26; the spring 14 abutting on the partition 3' of head 3 holds the piston 20 forced against the stem 30' of piston 30 in front thereof, said stem 30' extending with a seal fit through partition 1'' and being in condition to act on the cup sleeve 37 and piston 20.

The surfaces of valves 9 and 13 adapted to fit on the respective seats are spaced apart through such a distance as when the pistons 30 and 20 are in the locations they are moved into by the action of springs 29 and 14 respectively, the valve 9 is held in closed position by the spring 10 whilst the valve 13 remains spaced from its seat 11 at the mouth of the cup sleeve 37.

The chamber 6'' is connected by a duct 43 with a port 7 connected with the conduit 68 leading from the auxiliary reservoir 67 of pressure fluid located on the trailer vehicle; the duct 43 also opens in the chamber 6' and causes this chamber to communicate with port 7.

The chamber 4 confined between the partition 3' and piston 20 is connected with port 5 from which extends the conduit 69 leading to the brake cylinders 66 of the trailed vehicle, while the chamber 21 confined between the piston 20 and partition 1'' is connected with the port 22 which in turn is connected with the conduit 72, 74 leading to the pedal control valve 61 located on the tractor vehicle; the outlet ports 38, 51, 39 of piston 20 are permanently connected with the atmosphere through the outlet ports 12 provided in the wall of casing 1.

The chamber 31 confined between partition 1'' and piston 30 is connected with the port 32 communicating in turn through conduit 75, 76 with the main reservoir 56 of pressure fluid located on the tractor vehicle; the communication is made through the passage 44 of a shutter 45 adapted to be manipulated by the handle 46 and forced by a spring 47 towards its seat 48. Said shutter 45 has a further angle-shaped passage 49 adapted to connect the duct 43 with a duct 50 opening in the chamber 31; the passages 44 and 49 of the shutter 45 have such an angular respective position as when the port 44 interconnects the chamber 31 and the port 32 said passage 49 is closed while when the passage 49 interconnects the duct 43 and hence the port 7 with the chamber 31, the passage 44 is closed and the communication of chamber 31 with port 32 is closed.

When the device is in its inoperative conditions illustrated in Fig. 3, the pressure fluid supplied by the main reservoir 56 of the tractor vehicle enters the port 32 and chamber 31 and opens the valve 27 against the action of spring 26; then it flows into chamber 6'' and goes to auxiliary reservoir 67 located on the trailed vehicle through duct 43 and port 7; the pressures in chambers 31 and 6'' balance each other and consequently the piston 30 holds its inoperative position under the action of spring 29.

At the time the brakes are applied by the actuation of the pedal control valve 61 located on the tractor vehicle, the pressures acting in opposite directions on piston 30 are balanced and said piston is stationary. Under the action of the control pressure fluid fed into chamber 21 through 74, 72, 22, the piston 20 moves against the action of its spring 14 and then firstly the valve 13 is seated on its seat 11 to shut the communication of port 5 and brake cylinders 66 of the trailed vehicle with atmosphere and subsequently the action developed by piston 20 and cup sleeve 37 on the coupled valves 13 and 9 causes the valve 9 to open while holding the valve 13 closed. Thus the pressure fluid flows from auxiliary reservoir 67 to the brake cylinders 66 through 7, 6', 8, 4, 5, 69, 70, 71.

In the above stated conditions the brakes are applied with a controlled pressure because the stroke of the piston 20 and therefore the rate of opening of valve 9 are proportional with the pressure caused to act in cylinder 21 by the control valve 61 and the possible fluid leakages in the brake system of the trailed vehicle are compensated for by a larger degree of opening of the valve 9.

When the control valve 61 is operated for the brake release, the piston 20 moves back under the action of the spring 14 and permits the valve 9 to close, while the further stroke of piston 20, after the valve 9 has been seated and restrains the valve 13 coupled with it by coupler 40 to move further, causes the seat 11 to be opened to put the port 5 in communication with the atmosphere through 4, 11, 38, 51, 39 and outlet 12.

In the event the trailed vehicle is separated from the tractor, the chamber 31 freely communicates with atmosphere through 44 and 32; then the fluid supplied by the auxiliary reservoir 67 and operative in 6'' through port 7 and duct 43 causes the valve 27 to close and then moves the piston 30 against the action of spring 29; the stem 30' thus acts on the piston 20 to close valve 13 and open valve 9 and causes the trailed vehicle brakes to be fully applied under the action of pressure fluid supplied through valve 9 by the auxiliary reservoir 67 of said vehicle.

When, assuming the parts to be in the lastly described conditions, it is necessary to release the brakes of the trailed vehicle, the shutter 45 is manipulated by means of its handle 46 to close the passage 44 and carry the passage 49 in a position connecting the chamber 31 with the duct 43 and accordingly with chamber 6'' and port 7 connected with the auxiliary reservoir 67.

Then pressures in chambers 6'' and 31 balance each other and the piston 30 is restored by the spring 29 in the illustrated position to permit the piston 20 to take under the action of the spring 14 its position by which the valve 9 cuts the intercommunication of port 5 with port 7 and the valve 13 opens to connect said port 5 with the outlet 12 opening to the atmosphere.

By manipulating the shutter 45 to restore it in its position illustrated in Figures 3 and 4, the firstly described conditions are again obtained and then the brakes are again applied and held applied by the pressure fluid derived from the auxiliary reservoir 67.

The above described manipulations of the shutter 45 may be repeated if necesary, until the pressure fluid stored in the auxiliary reservoir 67 is exhausted.

The embodiment of the shutter 45 in the distributor 1 removes troubles and leakages inherent to devices in which an equivalent valve is located at a distance from said distributor and is connected with it and pressure fluid reservoir 67 by means of separate conduits.

The distributor of this invention provides for the desired control of the brakes in a trailed vehicle under any circumstance and its arrangement and organization make the inspection and adjustment of its parts easy by the mere removal of the casing heads without disconnecting the conduits leading to said casing.

I claim:

1. A distributor for controlling the intercommunication of a main pressure fluid reservoir, an auxiliary reservoir, a control pressure fluid source and brake actuating cylinders in a vehicle, comprising a casing, means in said casing providing two intercommunicating chambers the first one having a connection with said auxiliary reservoir and the second one having a connection with said brake cylinders and an outlet, valve means controlling the intercommunication of said chambers and said outlet, means actuated by said control pressure fluid for operating said valve means, a head on said casing providing a cylinder whose mouth opens in said first chamber and whose end has a connection with said main reservoir, a piston mounted to move in said cylinder intermediate said mouth and end thereof, and lost motion means for actuation of said valve means by said piston.

2. A distributor for controlling the intercommunication of a main pressure fluid reservoir, an auxiliary reservoir, a control pressure fluid source and brake actuating cylinders in a vehicle, comprising a casing, means in said casing providing two intercommunicating chambers the first one having a connection with said auxiliary reservoir and the second one having a connection with said brake cylinders and an outlet, valve means controlling the intercommunication of said chambers and said outlet, means actuated by said control pressure fluid for operating said valve means, a head on said casing providing a cylinder whose mouth opens in said first chamber and whose end has a connection with said main reservoir, a piston mounted to move in said cylinder intermediate said mouth and end thereof, said piston having a port, a valve controlling said piston port, means tending to close said piston port valve against said main auxiliary pressure operative in said cylinder and lost motion means for actuation of said valve means by said piston.

3. A distributor for controlling the intercommunication of a main pressure fluid reservoir, an auxiliary reservoir, a control pressure fluid source and brake actuating cylinders in a vehicle, comprising a casing, means in said casing providing two intercommunicating chambers the first one having a connection with said auxiliary reservoir and the second one having a connection with said brake cylinders and an outlet, a valve controlling said port and a valve controlling said outlet, spring means holding said port valve closed and said outlet valve open, a rocker actuating said outlet valve and said port valve in succession, means actuated by said control pressure fluid for operating said rocker, a return spring for said rocker, a head on said casing providing a cylinder whose mouth opens in said first chamber and whose end has a connection with said main reservoir, a piston mounted to move in said cylinder intermediate said mouth and end thereof, and lost motion means for actuation of said rocker by said piston when the main pressure fluid fails in said cylinder.

4. A distributor for controlling the intercommunication of a main pressure fluid reservoir, an auxiliary reservoir, a control pressure fluid source and brake actuating cylinders in a vehicle, comprising a casing, means in said casing providing two intercommunicating chambers the first one having a connection with said auxiliary reservoir and the second one having a connection with said brake cylinders and an outlet, valve means controlling the intercommunication of said chambers and said outlet, a head on said casing providing a cylinder having a connection with said control pressure fluid source, a piston mounted to move in said cylinder under said control pressure made operative therein, a member acted on by said piston and actuating said valve means, return means for said member and actuating piston, a second head on said casing providing a cylinder whose mouth opens in said first chamber and whose end has a connection with said main reservoir, a piston mounted to move in the last named cylinder intermediate said mouth and end thereof, and lost motion means for actuation of said valve means actuating member by said last named piston.

5. A distributor for controlling the intercommunication of a main pressure fluid reservoir, an auxiliary reservoir, a control pressure fluid source and brake actuating cylinders in a vehicle, comprising a casing, means in said casing providing two intercommunicating chambers the first one having a connection with said auxiliary reservoir and the second one having a connection with said brake cylinders and an outlet, a valve controlling said port and a valve controlling said outlet, spring means holding said port valve closed and said outlet valve open, a rocker actuating said outlet valve and said port valve in succession, a head on said casing providing a cylinder having a connection with said control pressure fluid source, a piston mounted to move in said cylinder under said control pressure fluid made operative therein, a member receiving a thrust action by said piston and actuating said rocker and valves, return means for said member, a second head on said casing providing a cylinder whose mouth opens in said first chamber and whose end has a connection with said main reservoir, a piston mounted to move in the last named cylinder intermediate said mouth and end thereof and adjustable lost motion means for actuation of said rocker actuating member by said last named piston.

6. A distributor for controlling the intercommunication of a main pressure fluid reservoir, an auxiliary reservoir, a control pressure fluid source and brake actuating cylinders in a vehicle, comprising a casing, a partition in said casing having a port and providing two chambers intercommunicating with said port the first one having a connection with said auxiliary reservoir and the second one having a connection with said brake cylinders and an outlet, valve means controlling said port and outlet, a removable head on said casing confining said second chamber and having a connection with said control pressure source, a piston mounted to move in said cylinder under said control pressure fluid made operative therein, a member mounted to reciprocate through said partition and acted on by said piston to actuate said valve means, return means for said member operative between said member and partition, a second removable head on said casing confining said first named chamber and providing a cylinder having a connection with said main reservoir, a piston mounted to move in the last named cylinder and acted on by the auxiliary reservoir pressure and main reservoir pressure in opposition to each other, and lost motion means for actuation of said member by said last named piston.

7. A distributor for controlling the intercommunication of a main pressure reservoir, an auxiliary reservoir, a control pressure fluid source and brake actuating cylinders in a vehicle, comprising a casing, a partition having a port and separating two chambers in said casing said chambers intercommunicating through a port in said partition and one of them having a connection with said auxiliary reservoir and the second one having a connection with said brake cylinders, a piston mounted to move in an apertured space of said casing to confine said second chamber and having an outlet, a valve controlling said port and a valve controlling said outlet said valves being aligned and interconnected, spring means holding said port valve closed and said piston spaced from said outlet valve, means for causing said control pressure fluid to act on said piston against the action of said springs, a second piston mounted to move in a space of said casing, means causing pressure fluid from said auxiliary reservoir, and pressure fluid from said main reservoir to act on said second piston in opposition to each other, and a stem fast on said second piston and operative by thrust on said first piston to move said piston against said spring means to close said outlet and open said port when the auxiliary reservoir pressure predominates on said second piston.

8. A distributor for controlling the intercommunication of a main pressure reservoir, an auxiliary reservoir, a control pressure fluid source and brake actuating cylinders in a vehicle, comprising a casing, a partition separating two chambers in said casing said chambers intercommunicating through a port in said partition and one of them having a connection with said auxiliary reservoir and the second one having a connection with said brake cylinders, a piston mounted to move in an apertured space of said casing to confine said second chamber and having a recess and outlet passages leading from said recess to said casing apertured space, a valve controlling said port and a valve controlling the mouth of said piston recess in said second chamber said valves being aligned and interconnected, spring means holding said port valve closed and said piston spaced from said outlet valve, means for causing said control pressure fluid to move said piston against the action of said springs, a member mounted to move in a space of said casing, means causing pressure fluid from said auxiliary reservoir and pressure fluid from said main reservoir to act on said movable member in opposition to each other and single direction operative means on said member to move said piston against said spring means to close said outlet and open said port when the auxiliary reservoir pressure predominates on said movable member.

9. A distributor for controlling the intercommunication of a main pressure reservoir, an auxiliary reservoir, a control pressure fluid source and brake actuating cylinders in a vehicle, comprising a casing, a partition having a port and separating two chambers in said casing said chambers intercommunicating through a port in said partition and one of them having a connection with said auxiliary reservoir and the second one having a connection with said brake cylinders, a piston mounted to move in an apertured space of said casing to confine said second chamber and having an outlet, a valve controlling said port and a valve controlling said outlet said valves being aligned and interconnected, spring means holding said port valve closed and said piston spaced from said outlet valve, means for causing said control pressure fluid to act on said piston against the action of said springs, a second piston mounted to move in a space of said casing, means causing pressure fluid from said auxiliary reservoir and pressure fluid from said main reservoir to act on said second piston in opposition to each other, said piston having an aperture for the flow of pressure fluid from said main reservoir to said auxiliary reservoir, a return valve controlling said piston aperture, and a stem fast on said second piston and operative by thrust on said first piston to move said piston against said spring means to close said outlet and open said port when the auxiliary reservoir pressure predominates on said second piston.

10. A distributor for controlling the intercommunication of a main pressure fluid reservoir, an auxiliary reservoir, a control pressure fluid source and brake actuating cylinders in a vehicle, comprising a casing, means separating two intercommunicating chambers in said casing one of said chambers having a connection with said auxiliary reservoir and the second chamber having a connection with said brake cylinders and an outlet, valve means controlling the intercommunication of said chambers and said outlet, means actuated by said control pressure fluid for operating said valve means, a member mounted to move in a chamber of said casing, a connection for supplying pressure fluid from said auxiliary reservoir into the space at one side of said movable member, a connection for supplying pressure fluid from said main reservoir into the space on the opposite side of said movable member, means for shutting the last named connection and for interconnecting said spaces to balance the fluid pressures therein, a return spring operative on said movable member in opposition to said auxiliary reservoir fluid pressure and means on said movable member actuating said valve means operating means to close said outlet and interconnect said chambers when the auxiliary reservoir pressure predominates on said movable member.

11. A distributor for controlling the intercommunication of a main pressure fluid reservoir, an auxiliary reservoir, a control pressure fluid source and brake actuating cylinders in a vehicle, comprising a casing having two end chambers and an intermediate chamber separated from each other by partitions having ports therein, one of said end chambers having a connection with said auxiliary reservoir and the adjacent intermediate chamber having a connection with said brake cylinders and an outlet in its intermediate portion, a valve controlling the port of said partition between said end and intermediate chambers, a spring holding said valve closed, a piston movable in said intermediate chamber and having an orifice leading to said outlet, a valve controlling said orifice and interconnected with said first named valve, a spring acting on said piston to hold it spaced from said valve controlling said orifice therein, said intermediate chamber having a connection with said control pressure fluid source for causing said control pressure fluid to actuate said piston in opposition to said spring operative thereon, a second piston mounted to reciprocate in the other one of said end chambers, a member seal-extending from said second piston through said partition separating said intermediate chamber from said second named end chamber for actuating said first named piston, said second named end chamber having connections with said main reservoir and auxiliary reservoir at the opposite sides of said second piston therein, said second piston having an aperture for the flow of pressure fluid from said main reservoir into said auxiliary reservoir and a return valve controlling said aperture of said second piston.

12. A distributor for controlling the intercommunication of a main pressure fluid reservoir, an auxiliary reservoir, a control pressure fluid source and brake actuating cylinders in a vehicle, comprising a casing having two end chambers and an intermediate chamber separated from each other by partitions having ports therein, one of said end chambers having a connection with said auxiliary reservoir and the adjacent intermediate chamber having a connection with said brake cylinders and an outlet in its intermediate portion, a valve controlling the port of said partition between said end and intermediate chambers, a spring holding said valve closed, a piston movable in said intermediate chamber and having an orifice leading to said outlet, a valve controlling said orifice and interconnected with said first named valve, a spring acting on said piston to hold it spaced from said valve controlling said orifice therein, said intermediate chamber having a connection with said control pressure fluid source for causing said control pressure fluid to actuate said piston in opposition to said spring operative thereon, a second piston mounted to reciprocate in the other one of said end chambers, a member seal-extending from said second piston through said partition separating said intermediate chamber from said second named end chamber for actuating said first named piston, said second piston providing two spaces at its opposite sides in said second end chamber, a connection leading to said main reservoir from the one of said spaces adjacent to said intermediate chamber, a duct leading from the other one of said spaces to said first end chamber connected with said auxiliary reservoir, a passage from said first space to said duct, means for alternatively shutting said connection or passage, a return spring acting on said second piston in opposition to said auxiliary reservoir fluid pressure, said second piston having an aperture for the flow of pressure fluid from said main reservoir into said auxiliary reservoir and a return valve controlling said aperture of said second piston.

13. A distributor for controlling the intercommunication of a main pressure fluid reservoir, an auxiliary reservoir, a control pressure fluid source and brake actuating cylinders in a vehicle, comprising a casing having two end chambers and an intermediate chamber separated from each other by partitions having ports therein, one of said end chambers having a connection with said auxiliary reservoir and the adjacent intermediate chamber having a connection with said brake cylinders and an outlet in its intermediate portion, a valve controlling the port of said partition between said end and intermediate chambers, a spring holding said valve closed, a piston movable in said intermediate chamber and having an orifice leading to said outlet, a valve controlling said orifice and interconnected with said first named valve, a spring acting on said piston to hold it spaced from said valve controlling said orifice therein, said intermediate chamber having a connection with said control pressure fluid source for causing said control pressure fluid to actuate said piston in opposition to said spring operative thereon, a second piston mounted to reciprocate in the other one of said end chambers, a member seal-extending from said second piston through said partition separating said intermediate chamber from said second named end chamber for actuating said first named piston, said second named end chamber having connections with said main reservoir and auxiliary reservoir at the opposite sides of said second piston therein, said second piston having an aperture for the flow of pressure fluid from said main reservoir into said auxiliary reservoir and a return valve controlling said aperture of said second piston, all said connections being provided in said casing and the ends of said casing consisting of removable parts.

LEONE KAMENAROVIĆ.